United States Patent
Mahmoud et al.

(10) Patent No.: US 11,407,933 B2
(45) Date of Patent: Aug. 9, 2022

(54) LOCATION AND ORIENTATION CONTROL BY ACID ETCHING PROCESS

(71) Applicant: King Fahd University of Petroleum and Minerals, Dhahran (SA)

(72) Inventors: Mohamed Mahmoud, Dhahran (SA); Abdelwahab Ali Zaki, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 179 days.

(21) Appl. No.: 16/665,729

(22) Filed: Oct. 28, 2019

(65) Prior Publication Data

US 2021/0122970 A1 Apr. 29, 2021

(51) Int. Cl.
C09K 8/74 (2006.01)
C09K 8/66 (2006.01)
E21B 43/27 (2006.01)
E21B 43/26 (2006.01)

(52) U.S. Cl.
CPC ............... C09K 8/74 (2013.01); C09K 8/66 (2013.01); E21B 43/26 (2013.01); E21B 43/27 (2020.05)

(58) Field of Classification Search
None
See application file for complete search history.

(56) References Cited

U.S. PATENT DOCUMENTS

| | | | |
|---|---|---|---|
| 7,571,766 B2 | 8/2009 | Pauls et al. | |
| 9,803,134 B2 | 10/2017 | De Wolf et al. | |
| 2005/0045380 A1* | 3/2005 | Eddison | E21B 10/40 175/57 |
| 2006/0102349 A1* | 5/2006 | Brady | C09K 8/52 166/282 |
| 2014/0124205 A1* | 5/2014 | Nasr-El-Din | C09K 8/74 166/307 |
| 2015/0107832 A1 | 4/2015 | Dewolf et al. | |
| 2015/0330199 A1* | 11/2015 | Legemah | C09K 8/72 166/307 |
| 2018/0258342 A1* | 9/2018 | Nguyen | C09K 8/74 |

(Continued)

FOREIGN PATENT DOCUMENTS

EP 1 817 391 B1 10/2008

OTHER PUBLICATIONS

Cash et al.; Acid Fracturing Carbonate-Rich Shale: A Feasibility Investigation of Eagle Ford Formation; Aug. 24, 2016; SPE-181805-MS; pp. 1-12 (Year: 2016).*

(Continued)

*Primary Examiner* — Anuradha Ahuja
(74) *Attorney, Agent, or Firm* — Oblon, McClelland, Maier & Neustadt, L.L.P.

(57) ABSTRACT

A method of controlling the fracture location, orientation, and reduce the breakdown pressure in multistage fracturing, particularly of unconventional reservoirs. Acid etching can be used to initiate small channels (wormholes) around the horizontal well, followed by the hydraulic fracturing fluid to create the fractures. The fracture orientation can follow the same direction of the etched part of the well and in the same location of the wormholes. The breakdown pressure can be reduced by 5, 10, 15%, or more, e.g., from 2200 to 1800 psi after acid etching which can minimize the pumping requirements at the surface and break the formation with very high breakdown pressure.

13 Claims, 11 Drawing Sheets

(56) References Cited

U.S. PATENT DOCUMENTS

2018/0334612 A1    11/2018  Bulekbay et al.
2019/0345807 A1*   11/2019  Purdy ..................... E21B 43/26
2021/0062068 A1*    3/2021  Shroff Rama ......... C09K 8/607

OTHER PUBLICATIONS

Barri, et al. ; Evaluation of Rock Mechanical Properties Alteration During Matrix Stimulation With Chelating Agents ; J. Energy Resources Technology 138(3) ; Feb. 5, 2016 ; Abstract Only ; 2 Pages.

* cited by examiner

LOCATION AND ORIENTATION CONTROL BY ACID ETCHING PROCESS

BACKGROUND OF THE INVENTION

Field of the Invention

The present disclosure relates to oil and gas exploration, particularly methods of fracturing in unconventional wellbores, such as in carbonate-containing formations and/or shale gas-bearing formations, particularly using acidic formulations.

Description of the Related Art

Shale gas-bearing formations are generally tight and compacted, often necessitating that the well in the shale gas-bearing formation be fractured. Hydraulic fracturing is a process wherein a mixture of water, proppant, and chemicals are pumped down the well and then into the shale gas-bearing formation under a (generally extremely high) pressure exceeding the formation minimum stress. As the mixture is forced into the formation rock, and down to surrounding rock, the pressure causes the shale gas-bearing formation to fracture. These fractures grow perpendicular to the formation minimum stress, form a larger surface area connecting the reservoir to the well, and allow the release of gas and/or oil into the well. The shape of the created fracture(s) is a function of many variables including as pad volume, fluid viscosity, proppant concentration, in-situ stress, and geomechanics of the rock.

Proppant is generally a solid material, such as sand, treated sand, or synthetic ceramic materials, designed to keep an induced hydraulic fracture open, during, or following a fracturing treatment. As the pumping pressure is lowered at the end of each stage, the fractures are kept slightly open by the proppant.

Multistage fracturing is used extensively in unconventional reservoirs. Once the far end of the horizontal well is fractured, a plug is inserted to isolate the fractured section of the well. Thereafter, further stages of perforation, fracturing, and plugging, may be repeated several times to the heel of the horizontal section. Typically, over sixteen fracture stages are completed in each well. Once all the stages are completed, the plugs are drilled out to permit the well to flow back hydrocarbons to the surface.

The conventional stimulation method is called "plug and perf" stimulation, which is representatively depicted in FIG. 1A. "Plug and perf" stimulation requires a cemented cased hole, and interrupts the hydraulic fracturing operation by repeated interventions from a perforation gun and coiled tubing.

The "ball and sleeve" method is an open hole, multistage stimulation method, requiring downhole installed sleeves, which sleeves are activated by progressively smaller size balls, as representatively depicted in FIG. 1B. Advantageously, the "ball and sleeve" method can allow a seamless pumping operation, as the "ball and sleeve" method connects the wellbore directly to the natural fracture. However, the location and the number of initiated hydraulic fractures in the "ball and sleeve" method are not well controlled as in the "plug and perf" method. The initiated fractures in the "ball and sleeve" method are usually concentrated around the installed packers used to isolate stages. Packers exercise some of the compression stress on the wellbore necessary for stage isolation, and thus change the wellbore hoop stress, which eases the initiation of hydraulic fractures around the packers.

Another stimulation technique gaining popularity is the "pinpoint" method, during which only on one cluster per stage is pumped. The main advantage of the "pinpoint" method is that the "pinpoint" method ensures that no zone is left unstimulated. Also, the "pinpoint" method requires less horsepower and personnel to treat each stage.

However, the "pinpoint" method requires more time and cost for stimulation of a well. The stage spacing is shorter in the "pinpoint" method than the "plug and perf" method and "ball and sleeve" method. Therefore, more stages are required to achieve the stimulation in the "pinpoint" method. Moreover, service companies usually charge more per stage rather than for pumped volume which can consequently add cost to stimulation treatment.

Efforts have been made toward solutions to problems in the art. US 2018/0334612 A1 by Bulekbay et al. (Bulekbay) discloses methods and systems for enhancing acid fracture conductivity of acid fracture treatments on subterranean formations. Bulekbay's method of acid fracture treatment may include initiating fracturing of a subterranean formation by forming a wellbore with a formation fracture, after initiating the fracturing for a period of time, injecting an acidic fluid into the wellbore to etch walls of the formation fracture to thereby create fracture conductivity, introducing a gas into the wellbore to foam fluids in the wellbore, and increasing a foam quality of the fluids with time during the treatment. Bulekbay's foam quality is based on a volume of the gas introduced into the wellbore and a total volume of the fluids in the wellbore. Bulekbay's acidic retard system uses 0.1 to 32 wt. % HCl, 0.1 to 12 wt. % formic acid, 0.1 to 20 wt. % acetic acid, and/or 0.1 to 92 wt. % methaneseleninic acid (MSA), with 0.1 to 40 wt. % chelating agent, or a carboxylic acid system, and the acidic retard system preferably gels. Bulekbay introduces a gas into the etched wellbore, e.g., $N_2$, $CO_2$, air, methane, or natural gas, to provide an acid fracture treatment with foaming by the gases or acidic retardation system. Bulekbay does not disclose a multiple stage fracturing method with an acid etching followed by fracturing.

U.S. Pat. No. 7,571,766 to Pauls et al. (Pauls) discloses a method of fracturing a production interval of a subterranean formation adjacent a wellbore that is open hole or has an uncemented liner. Pauls' method involves: (a) perforating a production interval zone by injecting a pressurized fluid through a hydrajetting tool into the subterranean formation, so as to form perforation tunnels; and (b) injecting a fracturing fluid into the perforation tunnels to create at least one fracture along each perforation tunnel. At least a portion of Pauls' pressurized fluid and/or fracturing fluid comprises a viscoelastic surfactant fluid. Pauls' pressurized, fracturing, and isolation fluids are preferably substantially free of polymeric materials. Pauls' method may inject a viscoelastic surfactant fluid and an acidizing fluid as a commingled fluid or intermittently. Pauls describes including an acidizing fluid with the fracturing fluid and injecting a viscoelastic surfactant fluid and an acidizing fluid as a commingled fluid or intermittently, without preference over injecting an acidizing fluid subsequent to fracturing, thereby etching the formation along the cracks to create channels of high conductivity along the fracture faces. Pauls does not disclose the composition of the pressurized or fracturing fluids, nor affecting fracture orientation or breakdown pressure.

EP 1 817 391 B1 by Zarhat et al. (Zarhat) discloses a method of treating a subterranean formation with a retarded self-diverting fluid system, involving contacting the formation with a mixture of acid, chelating agent, and betaine surfactant. Zarhat's betaine surfactant is mixed with an aqueous chelating agent solution at a pH below ~3.0, but above the pH at which the free acid of the chelating agent precipitates. The resulting fluid system is utilized for both acid fracturing and matrix stimulation, as well as workover procedures such as scale and filter cake removal, especially in high temperature formations. Zarhat uses a viscoelastic surfactant that gels as stimulation proceeds to facilitate leak off control, diversion, and drag reduction. Zarhat does not use mineral acid to react with the formation because any acid added to the formulation to adjust the pH does not persist once it is added to Zarhat chelant because the acid is consumed in neutralizing the alkaline chelant. Zarhat does not teach influencing fracture orientation or reducing breakdown pressure.

U.S. Pat. No. 9,803,134 to De Wolf et al. (De Wolf I) discloses an acidic aqueous solution containing 10 to 60 wt. % of a chelating agent and an acid. De Wolf I's chelating agent is glutamic acid N,N-diacetic acid (GLDA) or a salt thereof, and the amount of GLDA or the salt thereof is at least 10 wt. %, based on the weight of the aqueous solution. De Wolf I describes the solution for us as an oilfield chemical, in descaling processes, or in processes in which highly concentrated aqueous acids are used, such as cleaning processes or plating processes. De Wolf I does not disclose influencing fracture orientation or reducing breakdown pressure.

US 2015/0107832 A1 by De Wolf et al. (De Wolf II) discloses a two-step process to produce oil or gas from a subterranean formation involving treating the subterranean formation with an aqueous composition containing a chelating agent (glutamic acid N,N-di-acetic acid (GLDA), aspartic acid N,N-diacetic acid (ASDA), methylglycine N,N-diacetic acid (MGDA), and/or N-hydroxyethyl ethylenediamine N,N',N'-triacetic acid (HEDTA), or salt(s). In a next step, in the outlet streams from the subterranean formation the aqueous phase is separated from the non-aqueous phase. De Wolf II discloses neither directing and/or influencing fracturing orientation nor reducing breakdown pressure.

*J. Energy Resour. Technol.* 2016, 138(3), 032907 by Barri et al. (Barri) discloses well stimulation using acidic solutions for carbonate formations, whereby the acidic fluids remove the near-wellbore damage and create channels around the wellbore by dissolving fraction of the carbonate rocks. Barri describes wormhole formation by these fluids, which can yield negative skin values and enhance the well productivity, and their diffusion inside the pores of the rock to change the rock mechanical properties, possibly weakening the rock strength and/or damaging future formation via wellbore instability. Barri describes the effect of ethylenediaminetetraacetic acid (EDTA) and diethylenetriaminepentaacetic acid (DTPA) chelating agents on the carbonate rocks elastic properties. Barri does not describe fracturing, much less influencing fracturing orientation or reducing breakdown pressure In light of the above, a need remains for methods of reducing breakdown pressure and/or influencing fracturing orientation, particularly for multistage fracturing, such as plug and perf, ball and sleeve or other such techniques.

SUMMARY OF THE INVENTION

Aspects of the invention provide multiple stage fracturing methods comprising: prior to a fracturing fluid, introducing an aqueous acid composition comprising an acid and/or an acidified chelating agent and having a pH in a range of from 2 to 5, into a wellbore located in a subterranean formation at one or more, optionally a plurality of, etching locations, interspersed with isolator elements, wherein the introducing reduces a density of the subterranean formation at the etching locations; after the introducing, rinsing the wellbore and the etching locations with a rinsing liquid; then injecting the fracturing fluid into the wellbore to thereby fracture the subterranean formation at the etching locations.

Aspects of the invention provide methods of directing fracturing in multistage hydraulic fracturing. Such methods may comprise: prior to a fracturing fluid, introducing an aqueous acid composition comprising an acid and/or an acidified chelating agent and having a pH in a range of from 2 to 5, into a wellbore located in a subterranean formation at one or more, optionally a plurality of, etching locations, thereby creating etched portions directionally aligned with wormholes at the etching locations; after the introducing, rinsing the wellbore and the etching locations with a rinsing liquid; then injecting the fracturing fluid into the wellbore to thereby fracture the subterranean formation at the etching locations along the etched portions directionally aligned with the wormholes.

Aspects of the invention provide methods of reducing a breakdown pressure of fracturing in multistage hydraulic fracturing, which methods may comprise: prior to a fracturing fluid, introducing an aqueous acid composition comprising an acid and/or an acidified chelating agent and having a pH in a range of from 2 to 5, into a wellbore located in a subterranean formation one or more, optionally at a plurality of, etching locations in wormholes; after the introducing, rinsing the wellbore and the etching locations with a rinsing liquid; then injecting the fracturing fluid into the wellbore to thereby fracture the subterranean formation at a breakdown pressure no more than 90% that of the breakdown pressure without the introducing of the aqueous acid composition.

Any of such methods can be modified by any permutation of the features described herein, particularly the following.

The aqueous acid composition may comprise HCl, HBr, $HClO_4$, $HBrO_4$, $H_2SO_4$, $H_3PO_4$, methanesulfonic acid, toluenesulfonic acid, benzenesulfonic acid, trifluoromethanesulfonic acid, formic acid, glycolic acid, acetic acid, oxalic acid, glutaric acid, trifluoroacetic acid, lactic acid, and/or citric acid. The aqueous acid composition may comprise HCl, acetic acid, and/or citric acid.

The aqueous acid composition may comprise the acid at a concentration in a range of from 1 to 20 wt. % of a total aqueous acid composition weight. The aqueous acid composition may comprise the acid at a concentration in a range of from 5 to 10 wt. % of a total aqueous acid composition weight.

Inventive methods may include fracturing all of the etching locations at the same time when the fracturing fluid are injected when the fracturing fluid is injected.

The aqueous acid composition may comprise 2.5 to 17.5 wt. % HCl, GLDA at pH less than 4, acetic acid, citric acid, EDTA GLDA at pH less than 4, HEDTA GLDA at pH less than 4, MGDA GLDA at pH less than 4, or NTA GLDA at pH less than 4.

The aqueous acid composition may comprise the chelating agent comprising ethylene diaminetetracetic acid (EDTA), N,N-dicarboxymethyl glutamic acid (GLDA), hydroxyethylethylenediaminetriacetic acid (HDTA), methylglycine diacetic acid (MGDA), and/or nitrilotriacetic acid (NTA).

The introducing of the acid composition may be carried out using an acid jetting tool. The etching locations may correspond to wormholes. The introducing of the aqueous acid composition may reduce a breakdown pressure of the subterranean formation to no more than 90% of the breakdown pressure without the introducing of the aqueous acid composition.

The aqueous acid composition may have a viscosity at 20° C. no greater than 15-fold that of water in mPa·s at 20° C. The aqueous acid composition may comprise no zwitterionic compounds.

The fracture of the subterranean formation at the etching locations may be directed by the introducing of the aqueous acid composition to within ±15° of a radial axes centered within the wormholes.

The subterranean formation may have a carbonate content of at least 25 wt. %.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE INVENTION

Figure 1A:
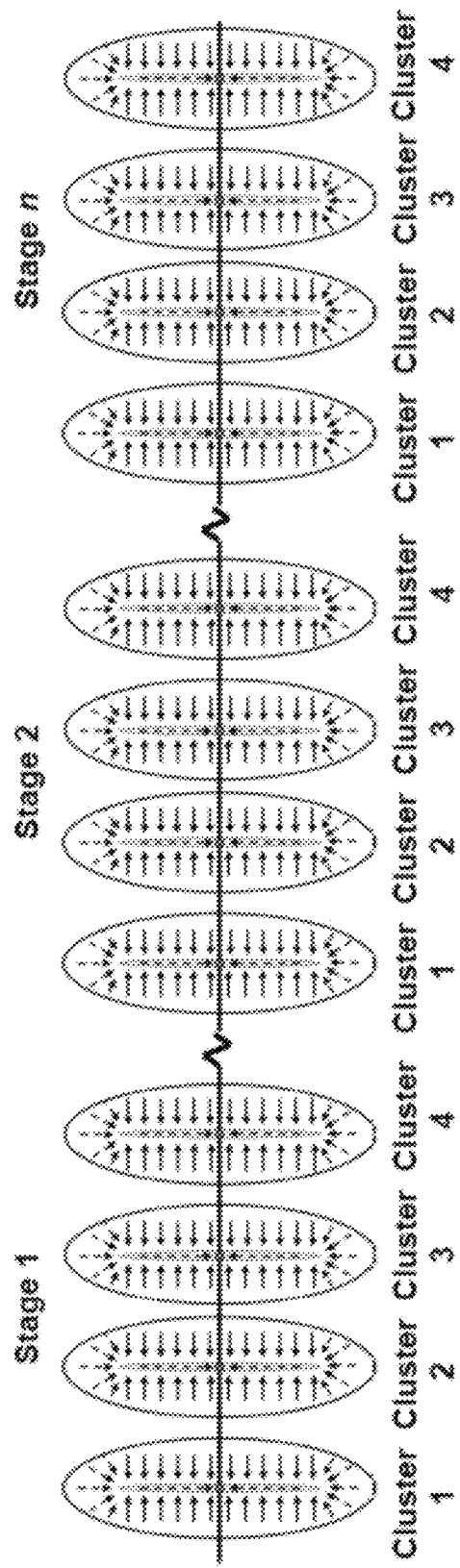
FIG. 1A shows a pictorial representation of the "plug and perf" method for multistage fracturing completion.

Aspects of the invention provide multiple stage fracturing methods comprising: prior to injecting a fracturing fluid, introducing an aqueous acid composition comprising an acid and/or an acidified chelating agent (aqueous acid composition the having a pH in a range of preferably from 2 to 5, i.e., at least 1, 1.25, 1.5, 1.75, 2, 2.25, 2.5, 2.75, 3, 4, 4.25, 4.5, 4.75, 5, and/or up to 5, 4.75, 4.5, 4.25, 4, 3.75, 3.5, 3.25, 3, 2.75, 2.5, 2.25, 2), into a wellbore, which may also be an in active wellbore, located in a subterranean formation at one or more, optionally a plurality, of etching locations, interspersed with isolator elements. Each region subject to impact by the introducing may include at least one etching location, such as in a ball and sleeve stimulation or pinpoint stimulation, or multiple etching locations, such as in plug and perf stimulation, between two isolator elements (such as plugs or packers). The introducing of the aqueous acid formulation typically reduces the density of the subterranean formation at the etching locations, e.g., 5, 10, 15, 25, 33, 40, 50%, or more relative to formation untreated by the aqueous acid formulation, particularly from the contacted surface to a depth of up to 10, 9, 8, 7.5, 7, 6, 5, 4, 3.5, 3, 2.5, 2, 1.5, 1, or 0.5 cm of the rock/wellbore surface contacted by the aqueous acid formulation. After the introducing of the aqueous acid formulation, the wellbore may be rinsed and the etching locations with a rinsing liquid, e.g., removing at least 50, 60, 70, 75, 80, 85, 90, 91, 92, 92.5, 93, 94, 95, 96, 97, 97.5, 98, 99, 99.1, 99.5, or 99.9 wt. % of the acid and/or an acidified chelating agent (and/or any byproducts) introduced in the introducing or otherwise present. Then, after the rinsing (and the introducing of the aqueous acid composition), the fracturing fluid is injected into the wellbore to thereby fracture the subterranean formation at the etching locations. The fracturing, i.e., injection of the fracturing fluid, may be conducted before or after removal of the isolation barriers, e.g., plugs, balls, and/or packers.

Aspects of the invention provide methods of directing fracturing in multistage hydraulic fracturing. Such methods may comprise: prior to injecting the fracturing fluid, introducing the aqueous acid composition comprising an acid and/or an acidified chelating agent (the aqueous acid composition having a pH in a range of, e.g., from 2 to 5, or any described above or below), into a wellbore located in a subterranean formation at a plurality of etching locations, thereby creating etched portions directionally aligned with wormholes at the etching locations; after the introducing, rinsing the wellbore and the etching locations with a rinsing liquid; then injecting the fracturing fluid into the wellbore to thereby fracture the subterranean formation at the etching locations along the etched portions directionally aligned with the wormholes.

The directional alignment with the etching locations may correspond to wormholes which have been created by penetrating into the wellbore, optionally through cement and/or into rock, e.g., by shooting, explosion, fluid jetting, etc. The directional alignment may be substantially orthogonal to the direction of the bore, i.e., on a radial axis perpendicular to an extension direction of the bore, for example, no more than 30, 24, 18, 15, 12, 10.5, 9, 8, 7.5, 7, 6.5, 6, 5.5, 5, 4.5, 4, 3.5, 3, 2.5, 2, 1.5, or 1° of the radial axis. The bore may be at least partially horizontal with respect to the ground or a platform from which, e.g., operational equipment outside of the well may be located. While a single wormhole or etch position per segment or per jetting tool outlet position (lengthwise along the wellbore) is possible, the etching locations may generally be radially distributed around a (generally cylindrical or rounded) circumference of a plane radially intersecting the wellbore, e.g., at no less than 2, 3, 4, 5, 6, 8, 9, 10, or 12 positions, but often no more than 36, 30, 24, 20, 16, 12, 9, 6, or 3.

Aspects of the invention provide methods of reducing a breakdown pressure of fracturing, e.g., of a wellbore portion, in multistage hydraulic fracturing. Such methods may comprise: prior to injecting a fracturing fluid, introducing an aqueous acid composition comprising an acid and/or an acidified chelating agent (the aqueous acid composition having a pH in a range of, e.g., from 2 to 5, or any described above or below), into a wellbore located in a subterranean formation at a plurality of etching locations in wormholes, i.e., cylindrical penetrations radially entering the rock formation from the wellbore (radially outwardly from a center axis of the wellbore). After the introducing of the aqueous acid composition, the wellbore and the etching locations may be rinsed with a rinsing liquid, thereby removing, e.g., all or some percentage described above. After the rinsing, the fracturing fluid may be injected into the wellbore to thereby fracture the subterranean formation at a breakdown pressure no more than 90, 89, 88, 87.5, 87, 86, 85, 84, 83, 82, 81, 80, 79, 78, 77, 76, 75, 72.5, 70, 67.5, or 65% that of the breakdown pressure without the introducing of the aqueous acid composition.

The etching locations may correspond to wormholes, and such locations and/or wormholes may have an average diameter in a range, e.g., of from 1, 2, 3, 4, 5, 6, 7, 8, 9, or 10 mm and/or up to 30, 25, 20, 18, 16, 14, 12, 11, 10, 9, 8, 7, 6, or 5 mm. The etching locations may correspond to wormholes, and such locations and/or wormholes may have an average depth in a range, e.g., of from 15, 20, 25, 30, 35, 40, 45, or 50, 60 mm and/or up to 250, 225, 210, 200, 180, 160, 150, 140, 130, 120, 110, 100, 90, 80, 75, 70, 65, or 60 mm. Inventive methods may perform the etching and fracturing in a segment-by-segment manner, i.e., a plugged or packed off (with an isolator element) segment at a time in a sequential way.

The introducing of the aqueous acid composition may be performed several times, e.g., 2, 3, 4, or 5 cycles of any of the above method, or in some applications only one time. The introduction may include injecting the aqueous acid composition under a pressure of, e.g., at least 80, 90, 100, 110, 120, 125, 133, 140, 150, 160, 167, 175, 200, 225, 250, 325, 400, 500, or 1000 psi and/or up to 10 k, 7.5 k, 5 k, 4, 3, 2, or 1 k psi (or, e.g., up to 700, 600, 500, 400, 300, 250, 200, 150, 125, 100, 90, 80, 75, 70, 65 or 60 bar). The introducing of the aqueous acid composition may be performed for, e.g., at least 5, 6, 7, 8, 9, 10, 12.5, 15, 20, or 25 minutes and/or 60, 55, 50, 45, 40, 35, 30, 25, 20, 15, or 10 minutes. The temperature of the aqueous acid composition may be an ambient temperature from the well or from the environment outside the well, or, for example, at least 10, 15, 20, 25, 30, 35, 40, 45, 50, 55, 60, 65, 70, or 75° C. and/or up to 100, 95, 90, 85, 80, 75, 70, 65, 60, 55, 50, 45, 40, or 35° C.

The aqueous acid composition may comprise HCl, HBr, $HClO_4$, $HBrO_4$, $H_2SO_4$, $H_3PO_4$, methanesulfonic acid, toluenesulfonic acid, benzenesulfonic acid, trifluoromethanesulfonic acid, formic acid, glycolic acid, acetic acid, oxalic acid, glutaric acid, trifluoroacetic acid, lactic acid, and/or citric acid. The aqueous acid composition may comprise HCl, acetic acid, and/or citric acid. The aqueous acid composition may comprise only one acid, or may comprise at least 2, 3, 4, 5, or more acids, or may comprise only zwitterionic compound(s) in acidic, i.e., protonated, form, such as one or more chelating agents, e.g., 1, 2, 3, 4, 5, 6, or more chelating agent. Any such chelating agent(s) may be combined with any of the acids in any number mentioned herein, preferably to arrive at a pH of 2 to 5, or any pH described above.

The aqueous acid composition may comprise the acid at a concentration in a range of from 1 to 20 wt. % of a total aqueous acid composition weight, e.g., at least 1, 2, 2.5, 3, 4, 5, 6, 7, 7.5, 8, 9, or 10 wt. % and/or up to 20, 19, 18, 17.5, 17, 16, 15, 14, 13, 12.5, 12, 11, 10 wt. %. The aqueous acid composition may comprise the acid at a concentration in a range of from 5 to 10 wt. % of a total aqueous acid composition weight, i.e., any of the previously mentioned endpoints and/or 5.33, 5.5, 5.67, 6.33, 6.5, 6.67, 7.33, or 7.5 wt. % and/or up to 9.67, 9.5, 9.33, 8.67, 8.5, 8.33, 7.67, 7.5 wt. %. The aqueous acid composition Inventive methods may include fracturing all of the etching locations at the same time when the fracturing fluid are injected when the fracturing fluid is injected. Alternatively, fracturing may be conducted only at the etching locations between a particular set of isolator elements (i.e., "segment"), or group of segments, such as 2, 3, 4, or 5 segments, which may be consecutive.

The aqueous acid composition may comprise the chelating agent comprising ethylene diaminetetracetic acid (EDTA), N,N-dicarboxymethyl glutamic acid (GLDA), hydroxyethylethylenediaminetriacetic acid (HDTA), methylglycine diacetic acid (MGDA), and/or nitrilotriacetic acid (NTA). The aqueous acid composition may comprise 2.5 to 17.5 wt. %, or any percentage discussed above, of HCl, acetic acid, citric acid, GLDA, EDTA+GLDA, HEDTA+GLDA, MGDA+GLDA, and/or NTA GLDA, wherein the GLDA, EDTA, HEDTA, MGDA, NTA, or combinations of such chelators are at a pH less than 4, 3.76, 3.67, 3.5, 3.33, 3.25, 3, 2.75, 2.67, 2.5, 2.25, 2, 1.75, 1.67, 1.5, 1.33, 1.25, or 1. Any other acid or combination of acids may be included in the aforementioned list. The aqueous acid composition may comprise no zwitterionic compounds in relevant applications. That is, the aqueous acid composition may comprise up to 33, 25, 20, 17.5, 15, 12.5, 10, 7.5, or 5 wt. % of one or more mineral acids (e.g., HCl, HBr, HCl, $HNO_3$, $H_3PO_4$, $H_2SO_4$, $H_3BO_3$, HF, HBr, $HClO_4$, HI, $HBrO_4$, and/or $H_5IO_6$) and/or organic acids (e.g., lactic acid, acetic acid, formic acid, citric acid, oxalic acid, uric acid, malic acid, trifluoroacetic acid, propionic acid, methanesulfonic acid, triflic acid, benzenesulfonic acid, benzoic acid, fumaric acid, gallic acid, maleic acid, phthalic acid, succinic acid, glutaric acid, tannic acid, tartaric acid, p-toluenesulfonic acid, and/or trichloroacetic acid), and/or chelators (sulfanilic acid, iminodisuccinic acid (IDS), ethylenediaminetetraacetic acid (EDTA), N-carboxymethyl-N'-(2-hydroxyethyl)-N,N'-ethylenediglycine (HEDTA, glutamic acid N,N-diacetic acid (GLDA), diethylenetriaminepentaacetic acid (DTPA), ethylenediamine-N,N'-disuccinic acid (EDDS), methylglycinediacetic acid (MGDA), iminodiacetic acid (IDA), nitrilotriacetic acid (NTA), 1,4,7,10-tetraazacyclododecane-1,4,7,10-tetraacetate (DOTA), ethylene glycol-bis(β-aminoethyl ether)-N,N,N',N'-tetraacetic acid (EGTA), 1,2-bis(o-aminophenoxy)ethane-N,N,N',N'-tetraacetic acid (BAPTA), ethylenediamine-N,N'-bis(2-hydroxyphenylacetic acid) (EDDHA), (methylimino)diacetic acid (MIDA), 3,6,9,12-tetrakis(carboxymethyl)-3,6,9,12-tetraazatetradecanedioic acid (TTHA), 2,2',2"-(1,4,7-triazonane-1,4,7-triyl)triacetic acid (NOTA), 2,2',2",2"'-(1,4,8,11-tetraazacyclotetradecane-1,4,8,11-tetrayl)tetraacetic acid (TETA), nicotianamine, Fura-1, and/or Fura-2) and at least 50 wt. % (or 55, 60, 65, 70, 72.5, 75, 77.5, 80, 82.5, 85, 87.5, 90 wt. %, or more) water. The aqueous acid composition may exclude any of these component, and/or those discussed in the background, and/or poly-2-acrylamido-2-methylpropane sulfonic acid-co-acrylamide (AMPS), the so-called thermoviscofying polymer (TVP), partially hydrolyzed polyacrylamide (HPAM), xanthan gum (XC), guar gum (HPG), polyaspartic acid, etc.

The introducing of the aqueous acid composition may be carried out using an acid jetting tool. Such acid jetting tool may have 1, 2, 3, 4, 5, 6, 7, 8, 9, or 10 outlets, generally arranged symmetrically about a longitudinal axis and/or directed radially relative to the longitudinal axis, i.e., the outlet(s) having at least a vectral component in the orthogonal to the longitudinal axis. The orientation of the outlet(s)

may be, for example, at least 60, 75, 78, 81, 84, 87, 90, 105, or 120°, relative to the longitudinal axis (typically around 90°). The outer diameter of the jetting tool will generally be dictated by the well diameter and may be, e.g., at least 5, 7.5, 10, 12.5, 15, 20, 25, 30, 35, 40, 45, 50, 55, or 60 cm and/or up to 100, 90, 80, 70, 60, 50, 40, 35, 30, or 25 cm.

The aqueous acid composition may have a viscosity at 20° C. no greater than 1.25, 1.5, 2, 2.5, 3, 4, 5, 6, 7, 7.5, 8.5, 10, 1.5, 12.5, 13.5, 15, 17.5, or 20-fold that of water in mPa·s at 20° C. The aqueous acid composition may have a viscosity at 60° C. no greater than 1.1, 1.15, 1.2, 1.25, 1.33, 1.4, 1.5, 1.67, 1.75, 1.85, 2, 2.25, 2.33, 2.5, 2.67, 2.75, 3, 3.5, 4, 4.5, 5, 6, 7, 7.5, 8, 8.5, or 10-fold that of water in mPa·s at 60° C. For example, the viscosity of the may be no more than water, ethanol, o-dichlorobenzene, 1,4-dioxane, N-methylpyrrolidone, 2-methoxyethanol, dimethyl acetamide, dimethyl sulfoxide, n-propanol, isopropanol, n-butanol, kerosene, and/or ethylene glycol, at 20, 25, 45, 50, 60, and/or 100° C.

The etching locations may correspond to wormholes or substantially cylindrical topological penetrations into a wellbore wall, substantially perpendicular to a length axis. Such cylindrical holes can be created during matrix stimulation, kinetic penetration, drilling, or acid fracturing of carbonate formations. The fracture of the subterranean formation at the etching locations may be directed by the introducing of the aqueous acid composition to within ±15, 14, 13, 12, 11, 10, 9, 8, 7, 6, 5, 4, 3, 2, 1, or 0.5° of a radial axes centered within the wormholes.

The introducing of the aqueous acid composition may reduce a breakdown pressure of the subterranean formation to no more than 90, 91, 92, 92.5, 93, 94, 95, 96, 97, 97.5, 98, 99, 99.1, 99.5, or 99.9% of the breakdown pressure without the introducing of the aqueous acid composition.

The subterranean formation may have a carbonate content of at least 25, 33, 40, 50, 60, 70, 75, 80, 85, 90, 92.5, 95, 97.5, or 99 wt. %. Relevant rock formations may comprise any of these contents of dolomite, calcite, aragonite, calcite, Mg-calcite, aragonite, huntite and/or hydromagnesite. The formation may comprise carbonate mudstone, wackestone, packstone, grainstone, boundstone, bafflestone, framestone, cementstone, condensed grainstone, fitted grainstone, and/or sparstone.

Aspects of the invention use acid etching to orient the multistage fracturing in the wellbore, rather than using acid etching to enhance the fracture conductivity. Inventive acid etching formulations and methods may additionally or alternatively direct the fracture and/or reduce the breakdown pressure and/or fracture pressure in a horizontal wellbore. Inventive methods can avoid, or use no more than 5, 4, 3, 2.5, 2, 1, 0.5, 0.1, 0.01, 0.001, 0.0001, or 0.00001 wt. %, relative to total acid formulation weight, of gelling materials and/or agents, such as linearly polymers, e.g., synthetic polymers including polyacrylamide (PAM), polyacrylates, and the like, biopolymers including guar, xanthan, carrageenan, starch biopolymers, several gums, carboxymethyl hydroxypropyl guar (CHMBG), crosslinked polymer systems, cross-linked gels, gels, polylactic acid (PLA), and/or viscoelastic surfactants, such as amide oxides, carboxybetaines, and the like.

Inventive methods and formulations may use polymer-containing (or polymer-free) fluids in hydrojetting for a wellbore either with or without a cemented liner. Inventive methods or formulations may avoid perforating at least one remedial perforation adjacent to a production interval. Inventive methods need not use a highly viscous isolation fluid, e.g., using fluids of viscocities no more than 1.1, 1.2, 1.25, 1.3, 1.4, 1.5, 1.6, 1.67, 1.75, 1.85, 2, 2.25, 2.5, 2.75, 3, 4, or 5-fold that of water.

Inventive methods and formulations may exclude or use no more than 15, 10, 7.5, 5, 4, 3, 2.5, 2, 1, 0.5, 0.1, 0.01, 0.001, 0.0001, or 0.00001 wt. %, relative to the total fracturing fluid weight, of surfactant(s), particularly betaine surfactant(s), alone or in combination. Inventive methods and formulations may have a pH over 1, 1.25, 1.5, 1.75, 2, 2.25, 2.5, 2.75, 3, 3.25, 3.5, or 3.75 and/or up to 6, 5.75, 5.67, 5.5, 5.33, 5.25, 5, 4.75, 4.67, 4.5, 4.33, 4.25, 4, 3.75, 3.67, 3.5, 3.33, 3.25, 3, 2.75, 2.67, 2.5, 2.33, 2.25, or 2.

Useful acids may include hydrochloric acid, hydrobromic acid, hydrofluoric acid, hydroiodic acid, sulfuric acid, nitric acid, phosphoric acid, formic acid, acetic acid, citric acid, lactic acid, malic acid, tartaric acid, maleic acid, boric acid, perchloric acid, methanesulfonic acid, trifluoroacetic acid, triflic acid, perbromic acid, and/or periodic acid.

Aspects of the invention provide methods of reducing the breakdown pressure of unconventionally fractured wellbores using acid, which acid can be introduced for unconventional and/or tight carbonate rocks. The acid may be hydrochloric acid (HCl); N,N-dicarboxymethyl glutamic acid (GLDA), optionally as a tetrasodium salt (Na4) or Na3, Na2, or Na1, at a pH less than 4; acetic acid, citric acid, ethylenediamine tetracetic acid (EDTA), optionally with GLDA, at a pH less than 4, N-(2-hydroxyethyl)ethylenediamine-N,N',N'-triacetic acid (HEDTA), optionally with GLDA, at a pH less than 4; methylglycinediacetic acid (MGDA), optionally with GLDA, at a pH less than 4, and nitrilotriacetic acid (NTA), also called N,N-bis(carboxymethyl)glycine or tris(carboxymethyl)amine, optionally with GLDA, at a pH less than 4. A concentration of the acid(s) may range, e.g., from 1 to 25, 2.5 to 15, or 5 to 10 wt. % in the aqueous acid formulation and/or fracturing fluid. The aqueous acid formulation and/or fracturing fluid may contain at least 75, 80, 85, 90, 91, 92, 92.5, 93, 94, 95, 96, 97, 97.5, 98, 99, 99.1, 99.5, or 99.9 wt. % (or a balance) of water. For example, the aqueous acid formulation may consist essentially of water and an acid (and/or chelator), i.e., such that the viscosity is not elevated any more than 25, 20, 15, 12.5, 10, 7.5, 5, 2.5, or 1%, relative to water. The aqueous acid formulation and/or fracturing fluid may exclude zwitterionic molecules, surfactants, and/or viscoelastic fluids, or contain no more than 10, 8, 7.5, 7, 6, 5, 4, 3, 2.5, 2, 1, 0.5, 0.1, 0.01, 0.001, 0.0001, or 0.00001 wt. % of any of these, relative to the total formulation or fluid weight, either individually or in combination. Treatment times with the aqueous acid formulation may be, for example, at least 1, 2.5, 5, 7.5, 10, 12.5, 15, 17.5, 20, 25, or 30 minutes and/or up to 120, 90, 75, 60, 45, 30, 25, 20, or 15 minutes.

Methods and formulations are suitable for carbonate formations and/or formations with carbonate content of at least 25, 30, 33, 35, 40, 45, 50, 60, 70, 75, 80, 85, 90, 95, or 99 wt. % of the formation rock weight, such as tight sandstone formations, shale formations, and the like. Inventive acid etching process can reduced the breakdown pressure by, e.g., at least 1, 2.5, 5, 7.5, 10, 12.5, 15, 17.5, 20, 22.5, 25, 33, 40, 50, 60, 70, 75%, or more, for the fracture. Inventive methods may reduce a rock formation density within 5, 4, 3, 2, 1.5, 1, 0.75, 0.5, 0.25, 0.15, 0.1, or 0.05 m of a central longitudinal axis of the wellbore by, e.g., at least 1, 2.5, 3.33, 5, 6.67, 7.5, 10, 12.5, 15, 17.5, 20, 25, 33, or 40% and/or up to 75, 67, 60, 55, 50, 45, 40, 35, 30, or 25%, relative to untreated rock.

Inventive acid etching methods can change the fracture geometry and create more conductive fractures, e.g., at least 2.5, 3.33, 5, 6.67, 7.5, 8.5, 10, 12.5, 15, 20, 25, 30, or 33% more conductive, compared to rock fractured without such acid etching.

EXAMPLES

Two shale gas carbonate samples of 2"×2" dimensions were prepared. The cores were drilled with a 6 mm drill bit using a brine solution to prevent clay swelling. The hole depth is 0.75".

Medical CT scans were carried out on the cores to check their structure and verify if the cores had any initial fractures.

One sample was treated with 10 wt. % aq. HCl acid solution, injected through the hole with constant pressure of 100 psi (0.689 MPa) and left for 10 minutes inside the core. The core was then washed out using a brine solution. A medical CT scan was run again on the post-treatment sample to check the effect of the acid on its structure.

Referring now to the drawings, wherein like reference numerals designate identical or corresponding parts throughout the several views.

Figure 1B:
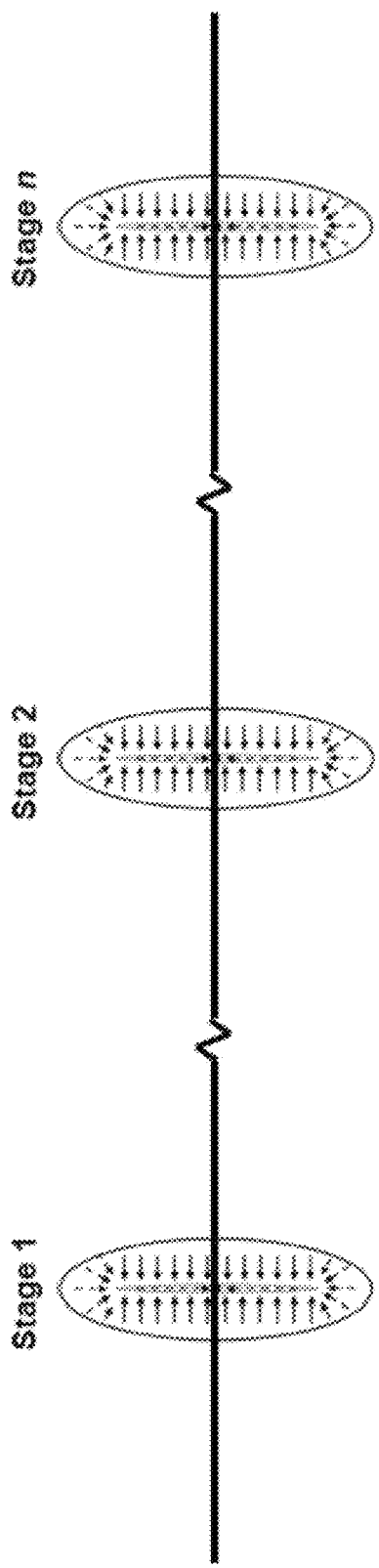
FIG. 1B shows a pictorial representation of the "ball and sleeve" method for multistage fracturing completion.

FIGS. 1A and 1B shows show representative sketches of the "plug and perf" (FIG. 1A) and the "ball and sleeve" (FIG. 1B) methods for multistage fracturing completion, wherein it can be seen that more closely clustered fractures are present in the respective stages in the "plug and perf" method in FIG. 1A. The "ball and sleeve" method in FIG. 1B.

Figure 2:
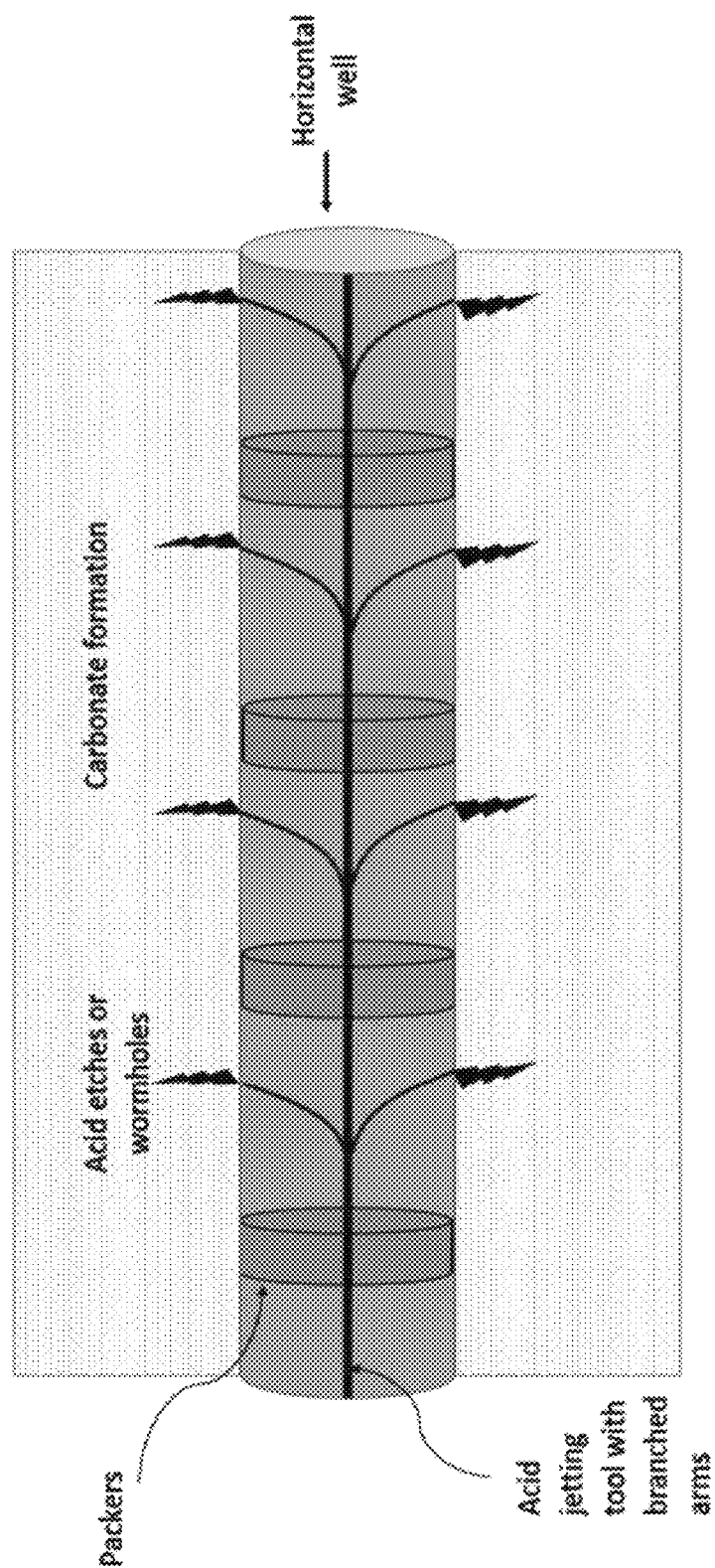
FIG. 2 shows a pictorial representation of acid etching to control the fracture direction and reduce the breakdown pressure in unconventional shale rocks.
Figure 3:
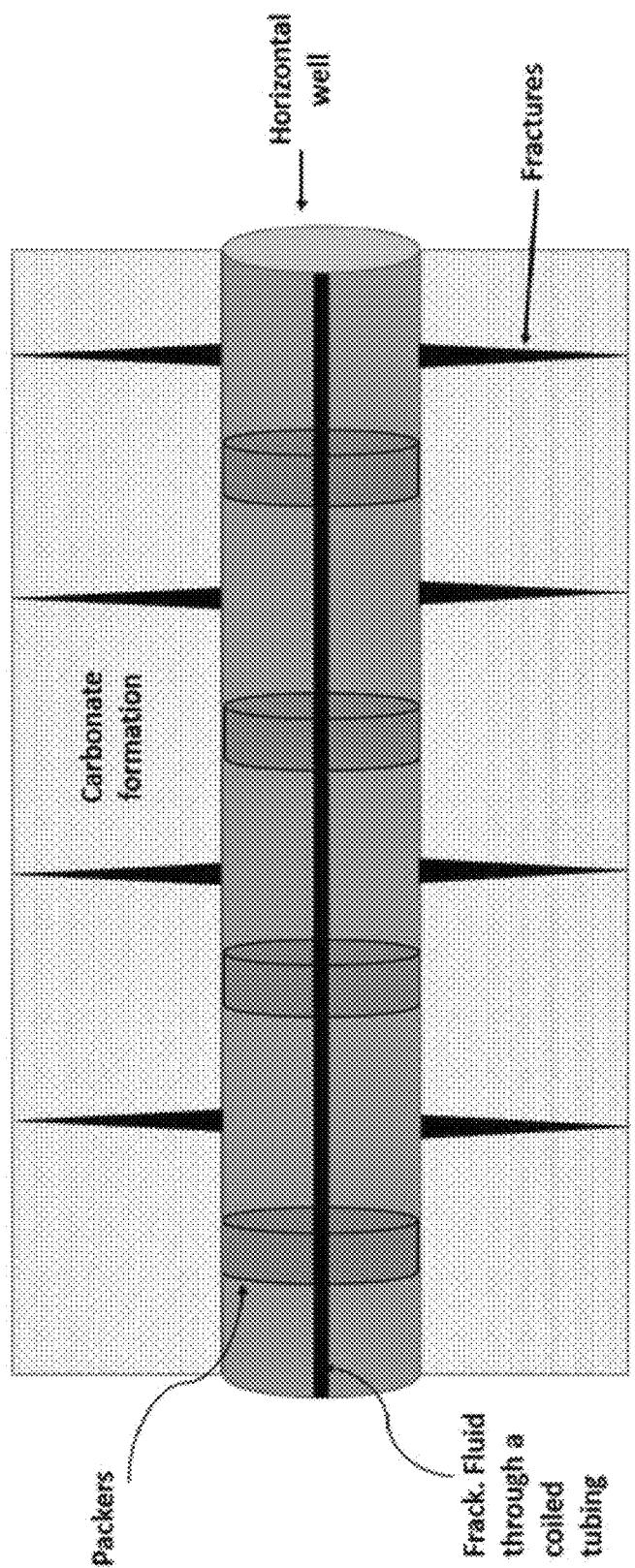
FIG. 3 shows a pictorial representation of fracture propagation after acid etching in unconventional shale rocks.

FIG. 2 and FIG. 3 representatively depict the methodology of field implementation of an exemplary method within the scope of the invention.

Figure 4A:
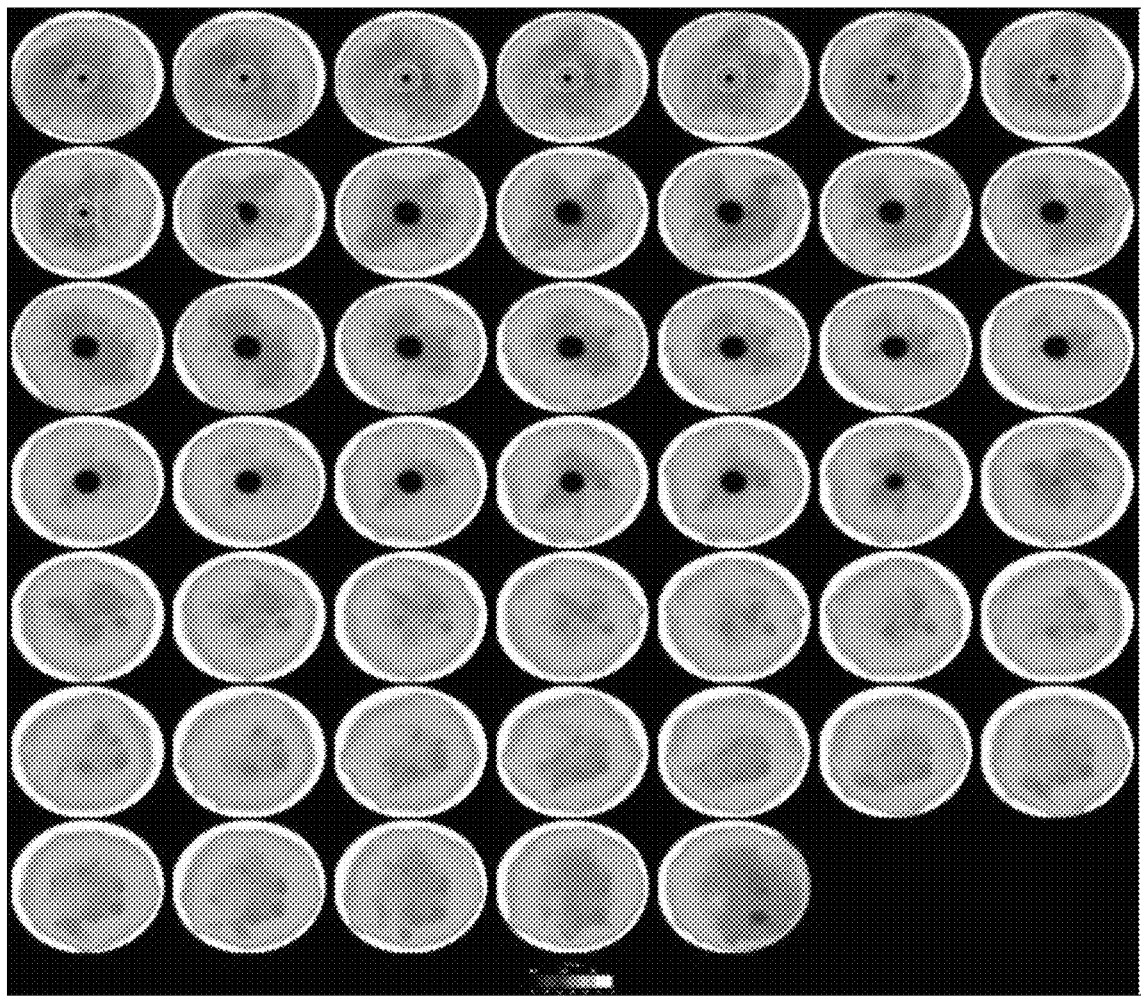
FIG. 4A shows computed tomography (CT) scans (also, computerized axial tomography, i.e., CAT, scans) for the cores before acid treatment showing no fractures around the hole.
Figure 4B:
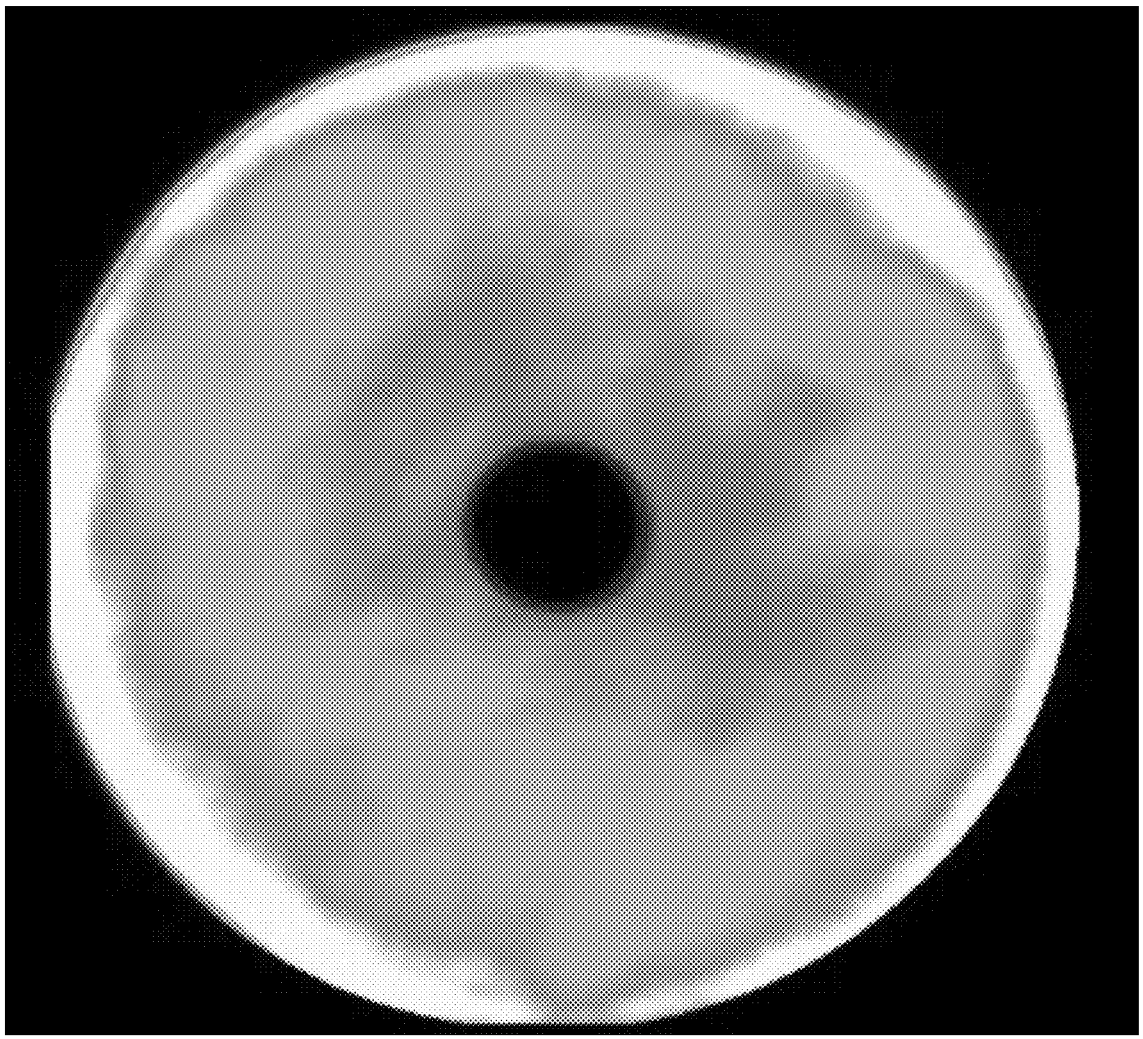
FIG. 4B shows a CT scan of a core from FIG. 4A at higher magnification.
Figure 5A:
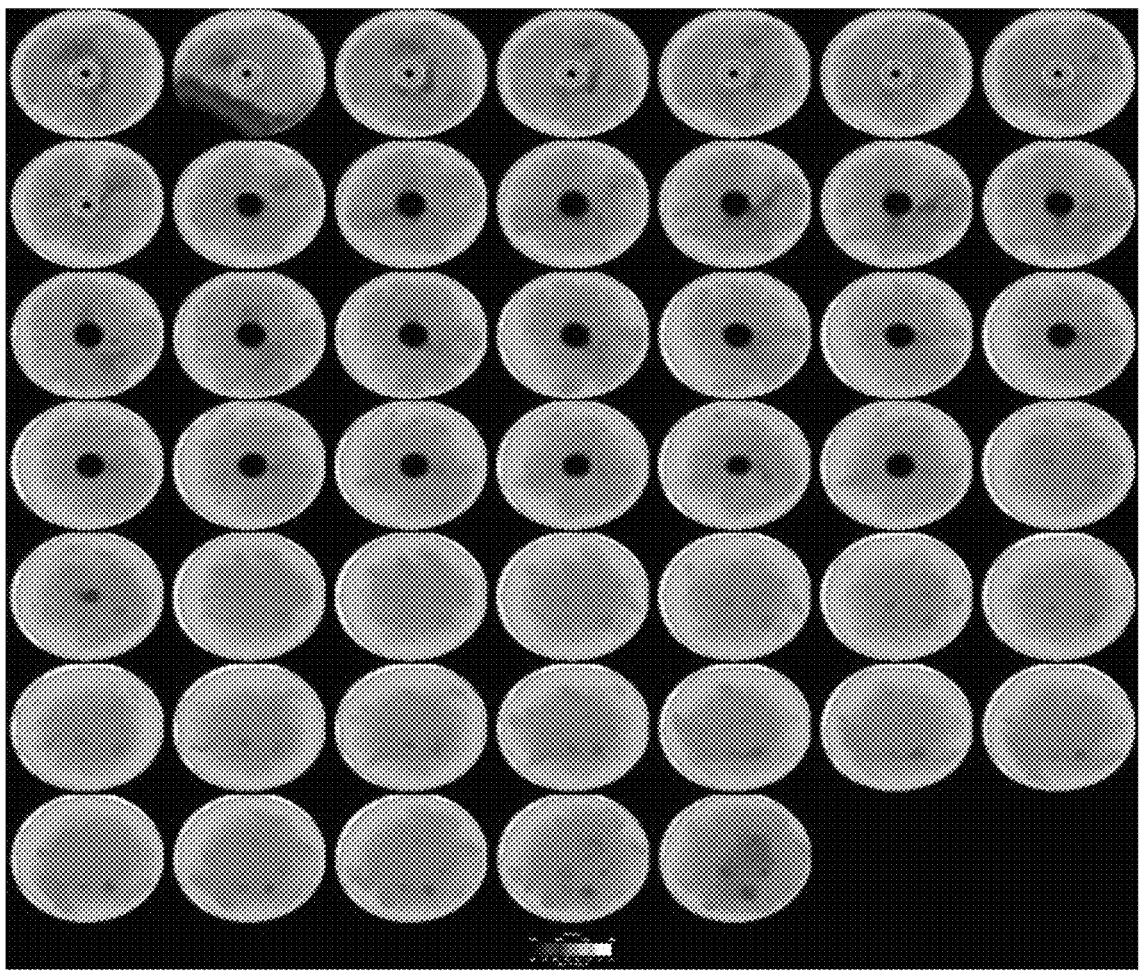
FIG. 5A shows CT scans of core samples after acid treatment showing some fractures initiated around the hole.
Figure 5B:
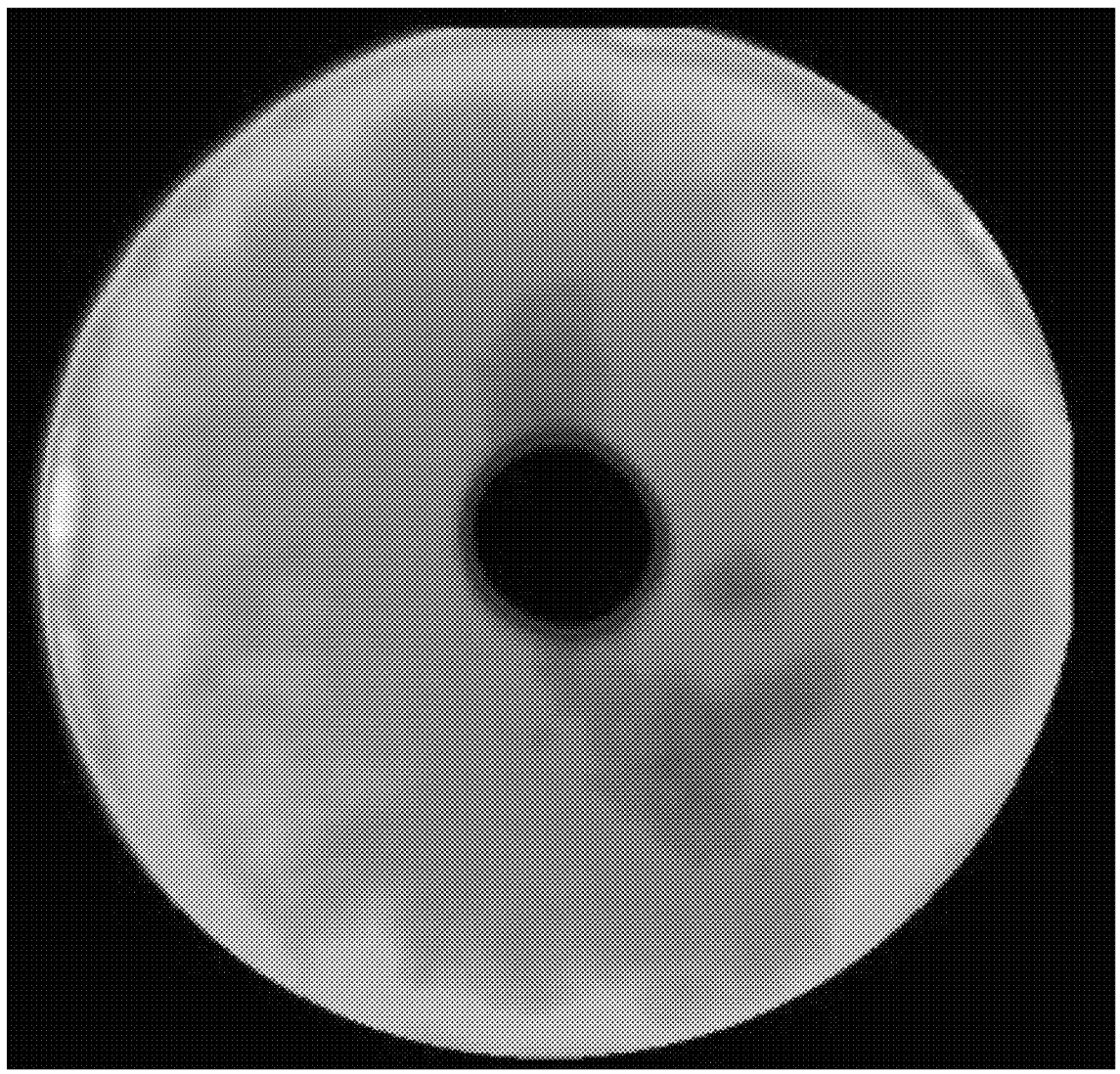
FIG. 5B shows a CT scan of a core from FIG. 5A at higher magnification.

The CT scan results from the Examples prior to acid treatment show that there is no indication of fractures around the hole drilled as seen in FIGS. 4A and 4B. However, FIGS. 5A and 5B show a density change around the holes, indicating the initiation of fractures radially to the bore.

The fracture pressure of the untreated sample with water was 2200 psi (15.17 MPa). After treating the core sample with 10 wt. % aq. HCl, the fracture pressure was reduced to 1800 psi (12.41 MPa). This 376 psi (2.59 MPa) difference, i.e., reducing the fracture pressure to less than 82% of the pressure of samples untreated by the aqueous acid formulation, may be due to the notches, branches, and/or veins created by the acid injection. In principle, reductions may be, e.g., 95, 92.5, 90, 89, 88, 87.5, 87, 86, 85, 84, 83, 82.5, 82, 81, 80, 77.5, 75, 72.5, 70, 66.7%, or less, of the fracture pressure of formations not treated by the acid formulation.

Figure 6:
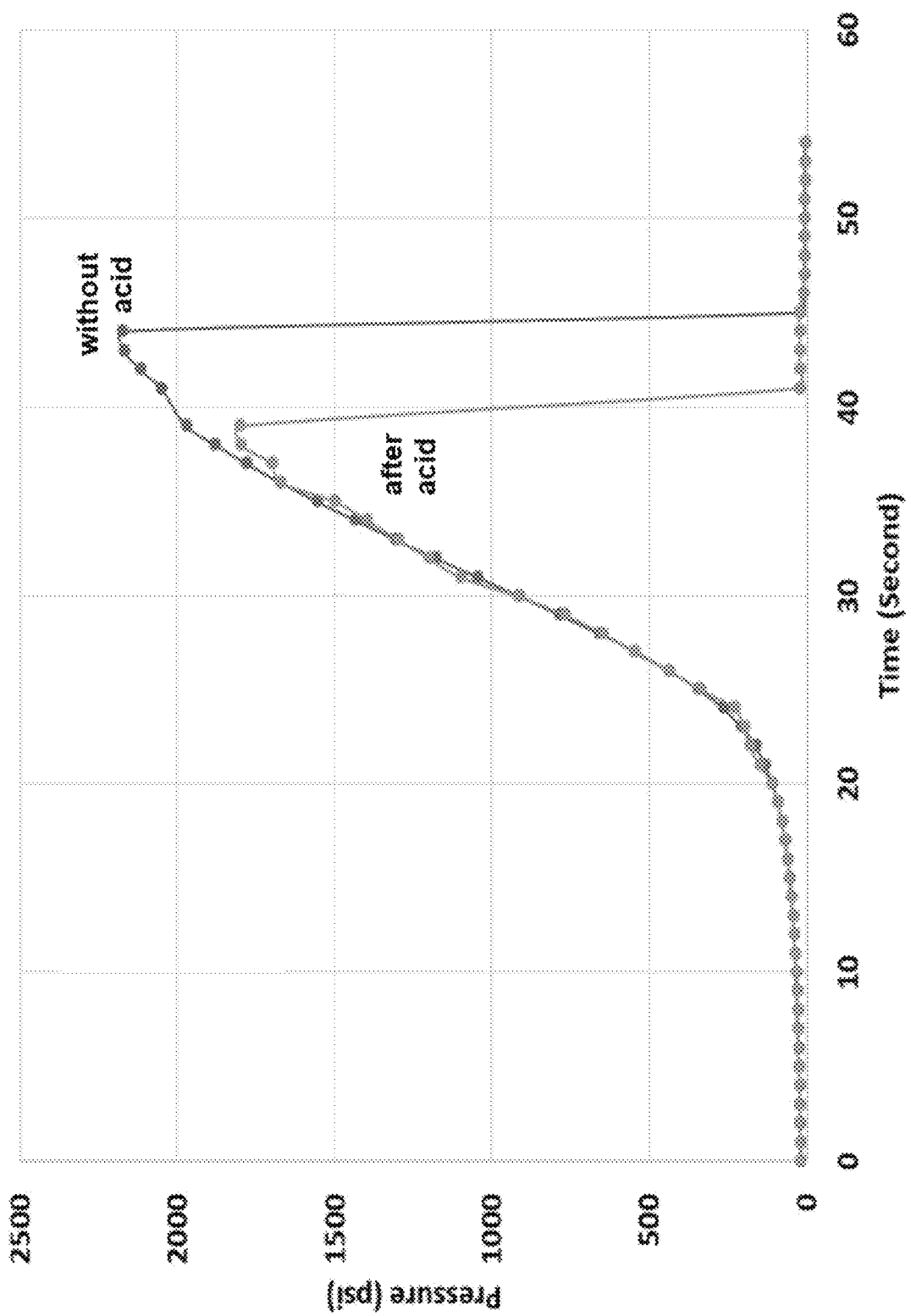
FIG. 6 shows a plot presenting the effect of acid etching on the breakdown pressure over time.

FIG. 6 shows a plot of pressure in pounds per square inch (psi) versus time, of the fracture pressure of the untreated rock sample and that of another rock sample which was treated with the acid treated according to a method and/or formulation within the scope of the invention.

Figure 7A:
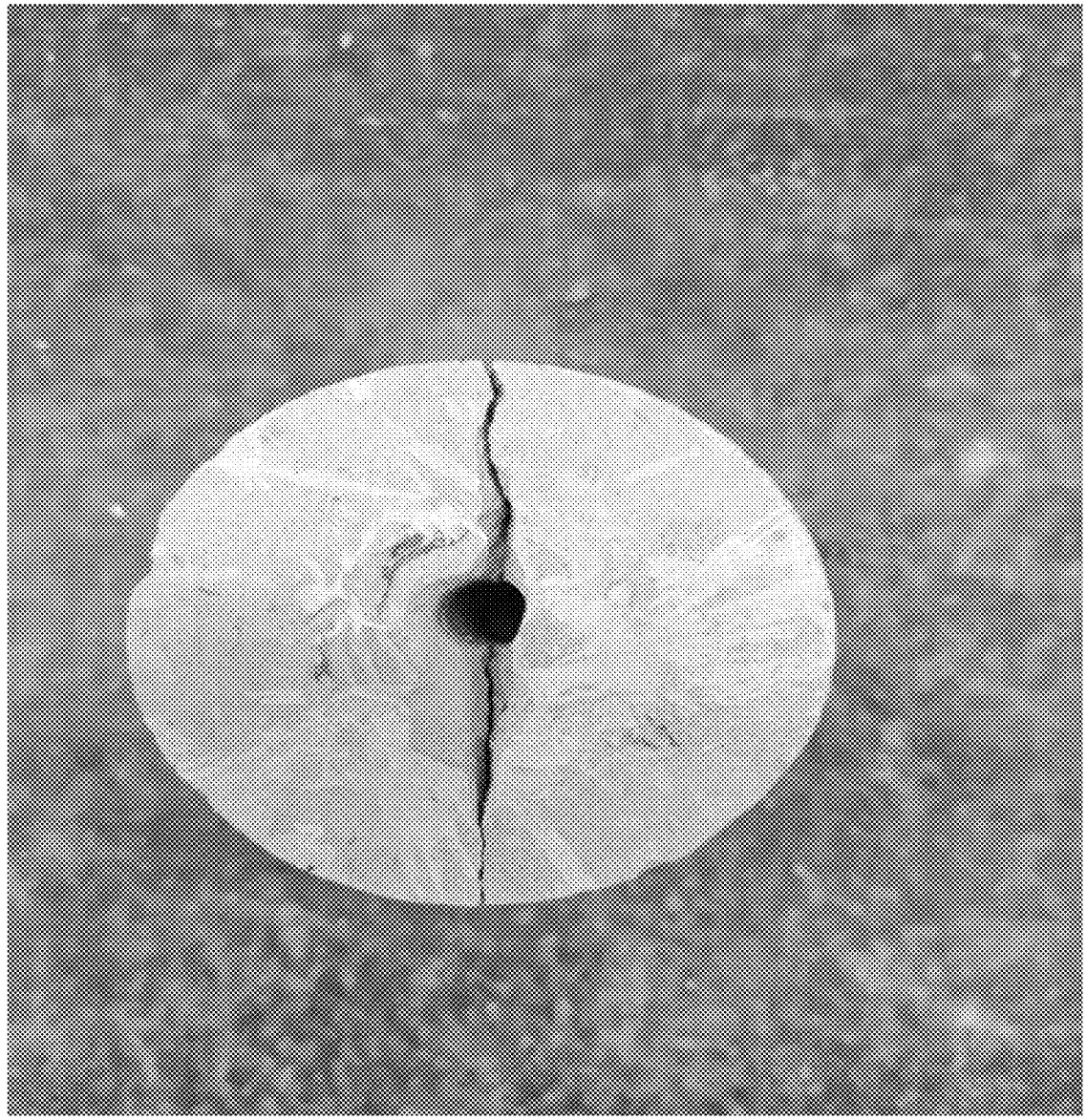
FIG. 7A shows a photograph illustrating the effect of acid etching on the fracture geometry, i.e., a fractured core without acid etching.
Figure 7B:
FIG. 7B shows a photograph depicting the effect of completed acid etching on the fracture geometry, i.e., a fractured core with acid etching.

FIGS. 7A and 7B show photographs of exemplary cores before (FIG. 7A) and after (FIG. 7B) acid etching, illustrating the effect of the acid etching on fracture geometry.

Numerous modifications and variations of the present invention are possible in light of the above teachings. It is therefore to be understood that within the scope of the appended claims, the invention may be practiced otherwise than as specifically described herein.

The invention claimed is:

1. A multiple stage method for hydraulically fracturing a subterranean formation, the method comprising:

introducing an aqueous acid composition at a pressure in a range of from 25 to 200 psi using an acid jetting tool, into a cased wellbore located in the subterranean formation, the subterranean formation comprising 60 to 99 wt. % carbonate rock, based on a total rock weight of the subterranean formation located within a 5 m radius of a longitudinal axis of the wellbore;

contacting the aqueous acid composition with a first zone of the subterranean formation at plural etching locations, interspersed with isolator elements, for a time period in a range of from 5 to 60 minutes, wherein the contacting reduces by at least 10% a density of the subterranean formation at the etching locations;

after the contacting, rinsing the wellbore and the etching locations with a rinsing liquid; then injecting a fracturing fluid into the wellbore thereby creating fractures in the subterranean formation at the etching locations, wherein the fracturing fluid is injected at a pressure in a range of from 1467.4 to 1870 psi, which is 15% to 33.3% less than a minimum breakdown pressure; wherein the minimum breakdown pressure is a minimum injecting pressure needed to fracture the subterranean formation, at the respective etching locations, without first contacting the subterranean formation with the aqueous acid composition, wherein the aqueous acid composition, has a pH in a range of from 2 to less than 4, and comprises an acidified chelating agent comprising N,N-dicarboxymethyl glutamic acid (GLDA) and an acid, wherein the acidified chelating agent and the acid are present in a range of from 7.5 to 12.5 wt. % based on a total weight of the aqueous acid composition;

wherein the subterranean formation is not hydraulically fractured before the introduction of the aqueous acid composition, and wherein the acid in the aqueous acid composition is at least one selected from the group consisting of HCl, HBr, HClO$_4$, and HBrO$_4$, wherein the acid is present in a range of from 5 to 10 wt. %, based on the total weight of the aqueous acid composition.

2. The method of claim 1, wherein the acid in the aqueous acid composition is the HCl.

3. The method of claim 1, wherein the injecting of the fracturing fluid includes fracturing the etching locations simultaneously.

4. The method of claim 1, wherein the acidified chelating agent further comprises at least one selected from the group consisting of ethylene diaminetetracetic acid (EDTA), hydroxyethylethylenediaminetriacetic acid (HEDTA), methylglycine diacetic acid (MGDA), and nitrilotriacetic acid (NTA).

5. The method of claim 1, wherein the aqueous acid composition has a viscosity in mPa·s at 20° C. no greater than 10-fold that of water in mPa·s at 20° C.

6. The method of claim 1, wherein the etching locations are in the form of wormholes having an average diameter in a range of from 5 to 20 mm and an average depth of from 15 to 250 mm.

7. The method of claim 6, wherein the fractures of the subterranean formation at the etching locations are directed, by the introducing of the aqueous acid composition, to within ±15° of a radial axes centered within the respective wormhole.

8. The method of claim 1, wherein the subterranean formation has 75 wt. % to 99 wt. % of the carbonate rock, based on the total rock weight of the subterranean formation located within a 5 m radius of the longitudinal axis of the wellbore.

9. The method of claim 1, wherein the acid consists essentially of the HCl and the acidified chelating agent consists essentially of the N,N-dicarboxymethyl glutamic acid (GLDA).

10. The method of claim 1, wherein the acid consists of the HCl and the acidified chelating agent consists of the N,N-dicarboxymethyl glutamic acid (GLDA).

11. The method of claim 1, wherein the aqueous acid composition, has a pH in a range of from 2 to 3.75.

12. The method of claim 1, wherein the aqueous acid composition, has a pH in a range of from 2 to 3.5.

13. The method of claim 1, consisting essentially of, in this order, the introducing, the contacting, the rinsing, and the injecting, wherein the introducing occurs once.

* * * * *